Oct. 28, 1958 E. S. MARIS, SR 2,858,134

SPINDLE ADAPTER

Filed April 6, 1954 3 Sheets-Sheet 1

INVENTOR.
Elwood S. Maris, Sr.

BY H. C. Newton

ATTORNEY

Oct. 28, 1958 E. S. MARIS, SR 2,858,134

SPINDLE ADAPTER

Filed April 6, 1954 3 Sheets-Sheet 2

INVENTOR.
Elmood S. Maris, Sr.

BY H. L. Newton

ATTORNEY

Oct. 28, 1958 E. S. MARIS, SR 2,858,134

SPINDLE ADAPTER

Filed April 6, 1954 3 Sheets-Sheet 3

INVENTOR.
Elwood S. Maris, Sr.
BY H. O. Newton
ATTORNEY

United States Patent Office 2,858,134

Patented Oct. 28, 1958

2,858,134

SPINDLE ADAPTER

Elwood S. Maris, Sr., Upper Darby, Pa., assignor to Radio Corporation of America, a corporation of Delaware Application April 6, 1954, Serial No. 421,225

7 Claims. (Cl. 274—10)

This invention relates to automatic record changers for phonographs of the type having a central turntable spindle for supporting and selecting records to be played. More particularly, this invention relates to detachable adapters for the central turntable spindle to permit the playing and automatic changing of records having center holes of substantially larger diameter than that of the central turntable spindle.

Development in the phonograph art has resulted in the use not only of different playing speeds, but also of different size spindle openings for present day records. As presently known, most commercial multi-speed record changers are provided with the standard small size turntable spindle, and, consequently only records having standard small sized center holes may be played thereon. Records of the enlarged center hole type such as the 45 R. P. M. records must each be fitted with an adapter wafer having the small spindle opening in order to be played on such record changers. This situation is not cured by the fact that single speed 45 R. P. M. automatic record changers of the drop type employing a relatively large turntable center post and adapted to play 45 R. P. M. records are available. The reason being that, unless the adapter wafers are used for the 45 R. P. M. records, it is presently necessary, in order to conveniently play records having all types of spindle openings, to employ at least two separate record changers instead of one.

In accordance with one form of this invention, there is provided, for automatic phonograph record changers of the type employing a standard small size turntable spindle having a record changing means housed therein, an adapter to be placed over said spindle. The adapter comprises an auxiliary spindle of the diameter of the larger center hole records having a central, axially extending guide channel or socket for receiving the turntable spindle. The auxiliary spindle includes record supporting and selecting means comprising a pair of oppositely disposed record supporting shoulders or shelves and a pair of oppositely disposed record separating blades or knives. A transverse slide member is mechanically coupled to the shelves and separators or blades through pivoted lever elements. Spring biasing means normally biases the shelves outwardly, while the separators are withdrawn inside the auxiliary spindle housing. Periodically, as the record changing means of the turntable spindle is actuated, a projection on the slide member is engaged by the record changing means of the small size turntable spindle to manipulate the shelves and separators in a desired manner.

Accordingly, it is an object of this invention to provide a simple and effective spindle adapter for an automatic record changer of the standard small size spindle type for playing records of the enlarged center hole type.

It is a further object of this invention to provide an auxiliary spindle adapter for automatic record changers which is of rugged construction and which is capable of giving dependable operation over a long operating life.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 7:
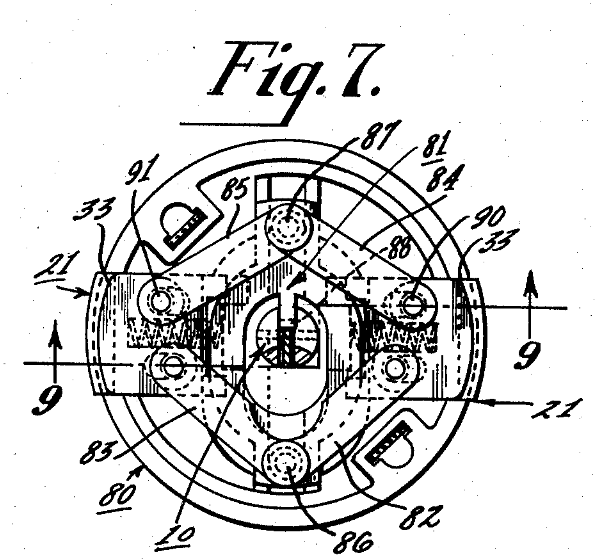
Figure 8:
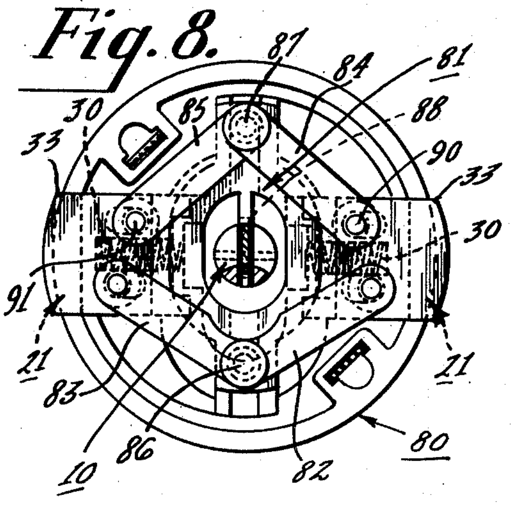
Figure 9:
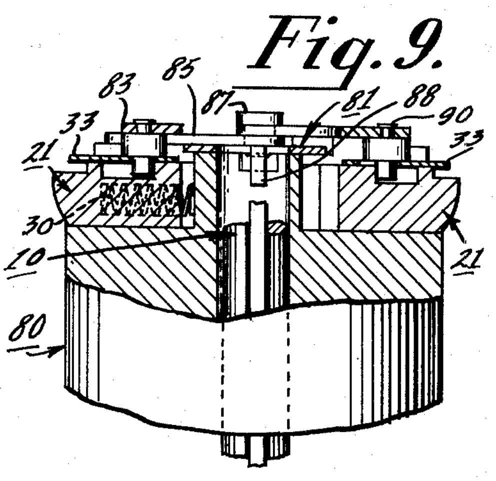

Figures 7 and 8 are top plan views of a further modification of the invention showing details of the arrangement of certain portions of spindle adapter mechanism constructed in accordance with the invention, during record playing and record changing cycles respectively; and Figure 9 is a sectional view taken on lines 9—9 of Figure 7 partly broken away and having a top portion removed of the embodiment of the adapter shown in Figures 7 and 8 showing certain constructional details thereof.

Figure 1:
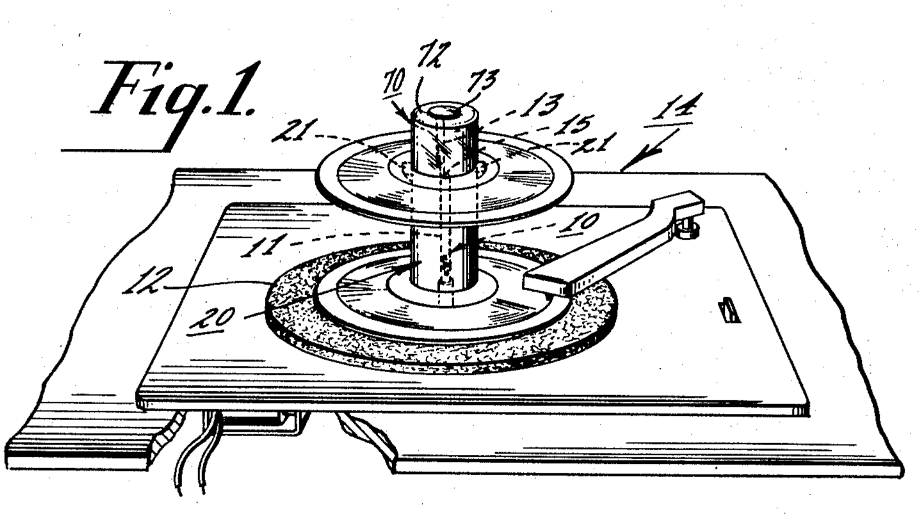
Figure 1 is a view, in perspective, of the top portion of a record changer employing a standard small size turntable spindle and having a detachable spindle adapter mounted in a position of cooperation with the turntable spindle in accordance with the invention.

Referring to the drawings in which like reference characters indicate like parts throughout, and referring more particularly to Figure 1, a multi-speed automatic record changer 14 of a type well known in the art employs a stationary spindle 10 having a shank 11 which projects through and above a turntable 12. An off-set spindle pilot or head 13 extends above the shank 11 in eccentric relation thereto to form a shoulder 15 upon which a stack of records may be supported. It is understood that the spindle adapter of the invention may be used with any well known small diameter spindles such as those having straight shank, and not having an off-set pilot portion.

In accordance with the invention, a spindle adapter or an auxiliary spindle 20 of the diameter substantially equal to the center hole diameter of enlarged center hole records is placed over the turntable spindle 10. Records of the enlarged center hole type are threaded over the top of the spindle adapter 20 and are supported by a pair of shelves 21 which extend from opposite sides of the spindle adapter body. As will hereinafter be explained, when the record changing cycle is initiated the record supporting and selecting means in the standard spindle 10 engages and actuates the supporting and selecting means in the adapter 20 for releasing successive lowermost records to drop to the turntable.

Referring now to Figures 2 to 6, the adapter 20 is provided with a body portion 22 which has a slide bar member 24 positioned at the upper end thereof. The slide bar 24 has limited movement radially on the spindle adapter body, the path of which is defined by four studs 26 and a pair of abutment plates 25. The abutment plates 25 are located in the center of the body portion 22 on either side of the axial bore for receiving the standard turntable spindle.

Figures 3, 6:
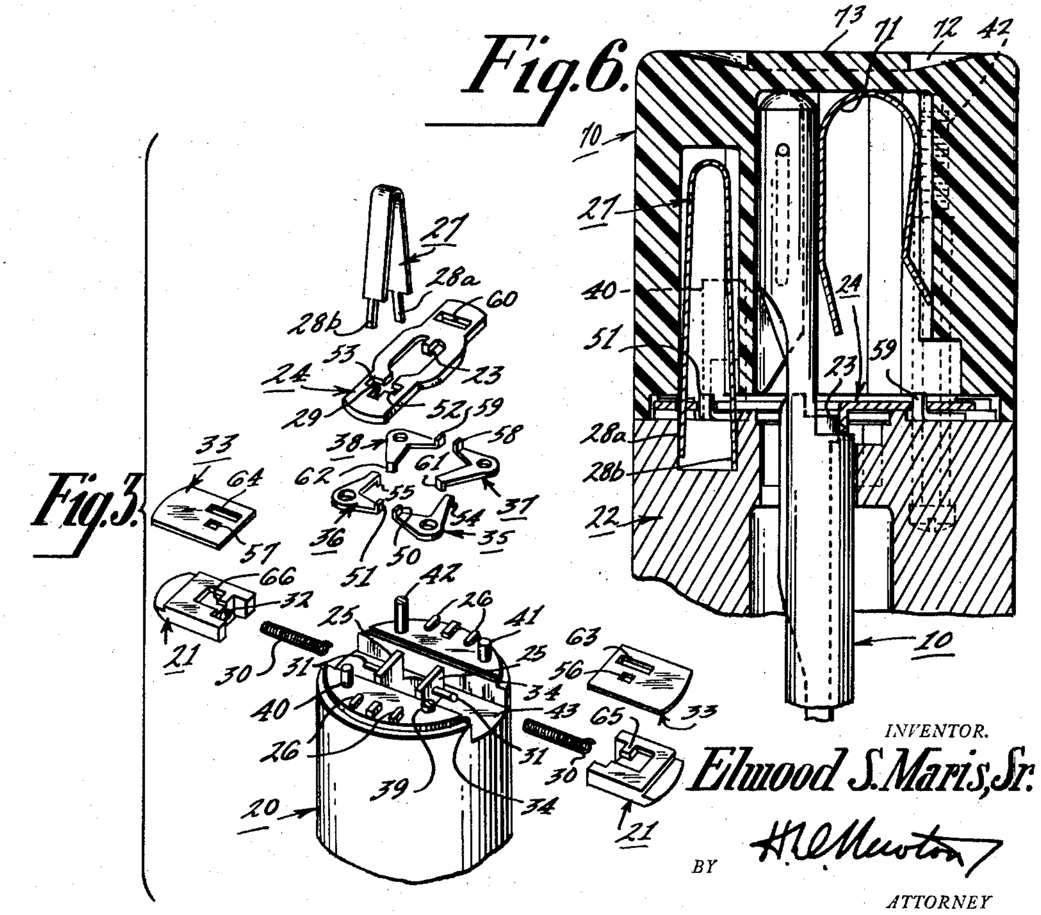
Figure 3 is an exploded view, in perspective, of certain internal portions of the spindle adapter shown in Figure 2.
Figure 6 is a sectional view taken on line 6—6 of Figure 2 of the upper portion of the spindle adapter displaced 90° with respect to the position in Figure 2 and mounted for operative relation with the turntable spindle in accordance with the invention.

The slide bar 24 has a downwardly extending actuating plate 23 which is adapted to be engaged and moved by the record selecting means of the standard turntable spindle 10 during the record change cycle. This movement of the slide bar effects a record change as will hereinafter be explained. A V-shaped spring member 27 having a pair of end portions 28*a* and 28*b* engages one end of the slide bar 24 to bias it to a normal position shawn in Figure 4. As shown in Figure 6, the end portion 28*a* of the spring 27 bears against an inside portion of the adapter housing 22 while the end portion 28*b* extends through and bears against a cut out portion 29 of the slide bar 24 to provide the biasing force.

A pair of oppositely disposed record supporting shelves 21 are positioned in a keyway 43 which is located in the upper end of the body portion 22 of the adapter. Each of the record supporting shelves 21 is slidably movable in the keyway and is biased outwardly by a spring 30 so as to normally extend from the adapter body 22. One end of the springs 30 surrounds the studs 31 which are located on the abutment plates 25 and the other end of the springs 30 extend into apertures 32 on the rear sides of the record supporting shelves 21.

A pair of record separating blades or knives 33 which are adapted to extend between the lowermost and next to lowermost records during a record change cycle but are normally withdrawn within the adapter housing are positioned directly above the supporting shelves 21. The record separators 33 ride on the slideways 34 which are cut in the sides of the main keyway 43. Each of the record supporting shelves 21 and separator blades 23 are coupled to the slide bar 24 through the operating levers 35, 36, 37, and 38.

The operating levers 35, 36, 37, and 38 are pivotally mounted at a point between the ends thereof on the studs 39, 40, 41 and 42 respectively. An upwardly projecting flange portion 50 on the operating lever 35 and a similar upwardly projecting flange portion 51 on the lever 36 extend upwardly through and operatively engage the slide bar 24 at the cut out portions 52 and 53 respectively. A downwardly projecting flange portion 54 on the operating lever 35 and a similar downwardly portion 55 on the lever 36 extend into a pair of apertures 56 and 57 respectively to operatively engage the record separating blades 33.

An upwardly extending flange portion 58 on the operating lever 37 and a similar upwardly projecting flange portion 59 on the lever 38 respectively, extend up through and engage the edges of an aperture 60 on the slide bar 24. A downwardly extending flange portion 61 on the operating levers 37 extends through an enlongated slot 63 in the separating blade 33 and operatively engages a projection 65 on the record supporting shelf 21. A similar flange portion 62 on the lever 38 extends through an elongated slot 64 on the other separating blade 33 and engages a projection 66 on the other record supporting shelf 21.

As best shown in Figure 6, the standard turntable spindle 10 projects into the cap portion 70 of the auxiliary spindle. A spring 71 mounted in the cap portion 70 engages the head portion 13 of the spindle 10 to insure that the adapter is securely positioned for operation by the operating lever 67. If desired, the top of the cap 70 may be provided with a shallow, concave portion 72 on which some sort of indicating means may be placed to show how the adapter should be oriented when placed over the standard spindle 10 so that the operating plate 23 will line up with the record selecting means of the small diameter spindle. The indicating means 73 may be a monogram or other insignia.

As can be seen, the standard small diameter spindle 10 is provided with an operating or record ejector lever 67. The downwardly projecting operating plate 23 on the slide bar 24 is positioned adjacent the operating lever 67 for operation thereby.

During a record change cycle the record ejector lever 67 of the standard turntable spindle 10 which is positioned adjacent the actuating plate 23 on the slide bar 24, moves against the actuating plate 23 to displace the slide bar across the spindle adapter against the force of the spring 27. As the slide bar 24 moves, the upwardly extending flange portions 50, 51, 58 and 59 engaged thereby cause the operating levers 35, 36, 37, and 38 to rotate. The rotation of the operating levers 35, and 36 which engage the separating blades 33, is in such direction to move the separating blades outwardly so that they extend from the spindle adapter housing. The rotation of the operating levers 37 and 38 in such direction that the flanges 61 and 62 bear against the projections 65 and 66 respectively to force the record supporting shelves 21 inwardly against the force of the spring 30 to a position within the adapter housing.

Upon retraction of the operating lever 67 of the standard turntable spindle, the slide bar 24 is returned to its normal position by the action of the spring 27. This causes the separating blades 33 to be retracted by the movement of the operating levers 35 and 36. The return of the slide bar 24 also causes the operating levers 37 and 38 to release the record supporting shelves 21 which then move outwardly under the force exerted by the springs 30.

In operation, a stack of enlarged center hole records are threaded over the cap portion 70 of the spindle adapter and are supported by the shelves 21. As described above, during a record changing cycle the operation of the standard turntable spindle selecting means causes the separating blades 33 to extend between the lowermost and the next to lowermost record of the stack and the shelves 21 to be withdrawn. The lowermost record then falls by the force of gravity to the turntable, and the remainder of the record stack is supported by the separating blades 33. When the standard turntable selecting means allows the slide bar 24 to return to its normal position the record supporting shelves 21 extend from the adapter housing to receive the record stack which is dropped thereon as the separating blades 33 are withdrawn into the housing. After the last record has been played the records on the turntable may be removed by pulling them up over the shelves 21 which will be cammed back within the adapter housing by the action of the sloping cam surface 21 as best seen in Figure 2.

On the bottom portion of the spindle adapter a cylindrical element 44 which has a bearing portion 47 is rotatably mounted on the lower portion of the adapter body 22. A cylindrical adapter extension portion 45 located inside the element 44 also surrounds the lower part of the adapter body 22 and is retained in place by a fitting 47 which is fastened to the lower end of the adapter body 22. The adapter extension 45 is biased downwardly so that it projects from the spindle within the limits established by the fitting 47 by a spring 46 which bears against the element 44. The element 44 is provided on one side thereof with a key 49 which fits into a slot 48 cut into the extension element 45.

The extension portion insures that the spindle adapter extends completely to the turntable even when used with spindles of slightly different lengths. The extension 45 is adapted to frictionally engage the turntable 12 for rotation therewith, thus causing rotation of the element 44 which is keyed to the extension 45. This construction prevents records from sliding under the spindle adapter and insures proper centering at all times as well as easy removal of the records without first removing the spindle adapter.

Figures 2, 4, 5:
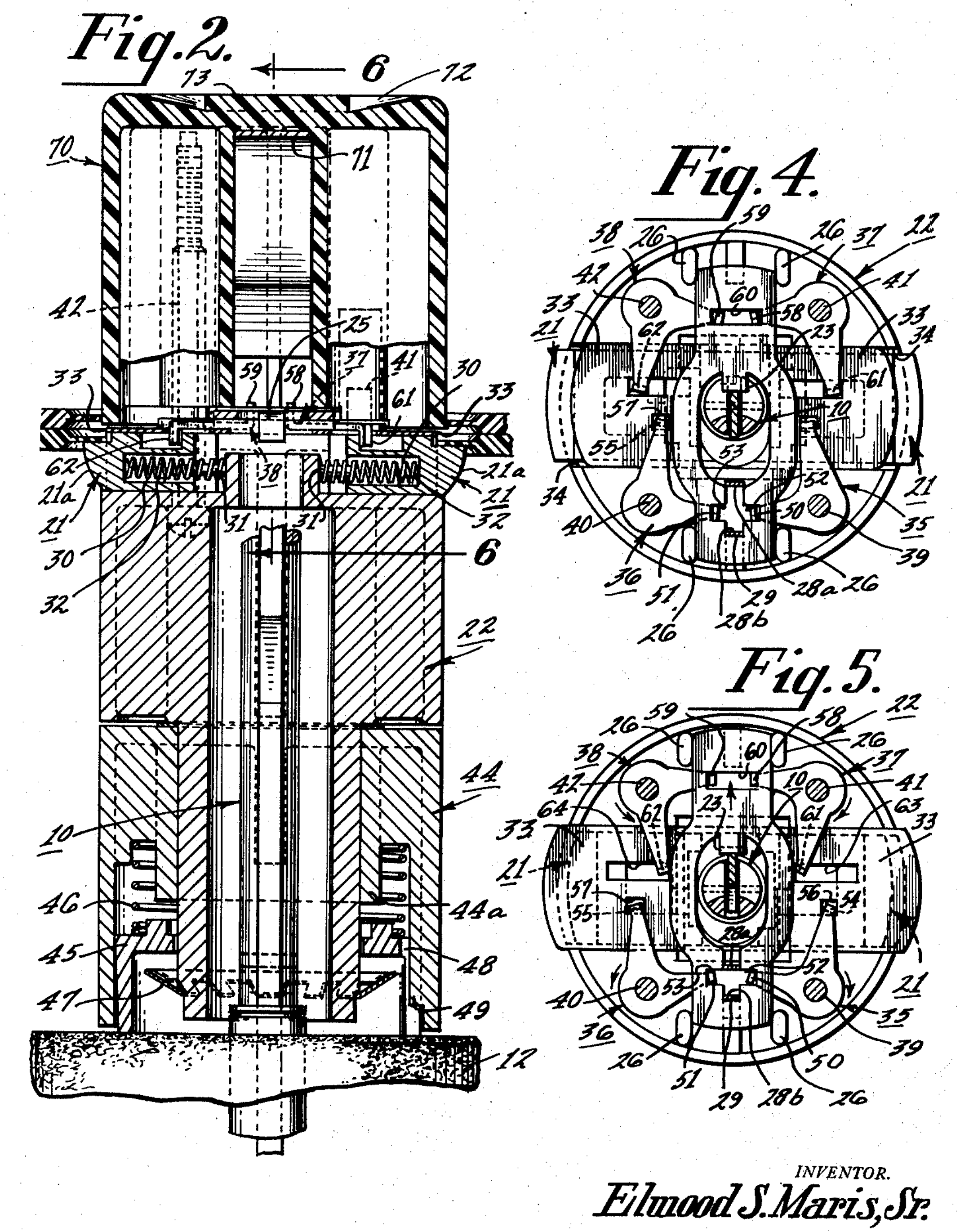
Figure 2 is a sectional view, in elevation, of a spindle adapter embodying the invention and mounted on the small diameter turntable spindle of the record changer of Figure 1, a portion of which is partly broken away.
Figures 4 and 5 are top plan views showing details of the interior arrangement of certain parts of the spindle adapter shown in Figure 2 during record playing and record changing cycles respectively.

Referring now to Figures 7, 8, and 9, which show another embodiment of the invention, an adapter body 80 which is similar to the adapter body 22, shown in Figures 2 and 6 supports at the upper end thereof an operating slide bar 81. The slide bar as previously described, is adapted to be engaged and operated by the operating lever or other record selecting mechanism of a standard small diameter spindle.

The adapter is provided with a pair of oppositely disposed record supporting shelves 21 which are placed in keyways located on the upper side of the adapter body 80 for movement radially of the adapter body but transverse to the movement of the slide bar 81. A pair of record separating blades 33 are disposed directly above the supporting shelves 21 and are adapted for complementary movement with the supporting shelves 21 to effect the successive record selection and dropping of lowermost records as explained hereinbefore.

Four operating levers 82, 83, 84 and 85 connect the shelves 21 and the blades 33 with the slide bar 81. The operating levers 82 and 83 are pivotally mounted at a common point on the slide bar 81 by a pivot pin 86, and are secured to move the respective separator blades 33. The operating levers 84 and 85 are pivoted at a common point on the slide bar 81 by the pin 87, and are connected to operate the record supporting shelves 21. The pivot points 86 and 87 of the operating levers are located on opposite ends of the slide bar 81 so that movement of the slide bar causes the opposite ends of one pair of levers to be drawn together and causes the opposite ends of the other pair of levers to be forced apart.

A pair of pins 90 and 91 fastened at the ends of the levers 84 and 85 extend downwardly through elongated slots in the separating blades 33 to engage the supporting shelves 21. In Figure 9 it can be seen that the pin 90 engages the inner end of an elongated slot in the top of the record supporting shelf 21. This permits positive inward control of the shelf 21 by the operating levers, and also permits the shelves to be cammed inward by records being removed from the turntable without interaction with the other parts of the mechanism. This is also true of the pin 91. The shelves 21 are biased outwardly by the springs 30 as described in connection wtih Figures 2 to 6.

The adapter housing, not shown in Figures 7 to 9, is the same as that shown in Figures 2 to 6. During a record change cycle the adapter is slipped over a standard small diameter turntable spindle. Upon operation of the record selecting mechanism, the operating plate 88 on the slide bar 81 is engaged to move the slide bar 81 radially of the adapter body. This movement causes the ends of the operating levers 82 and 83 to move outwardly thereby forcing the record separating blades 33 to a position where they extend from the adapter body as shown in Figure 8. At the same time, the operating levers 84 and 85 are moved in such a manner to pull the supporting shelves 21 inwardly until they are completely withdrawn within the body of the spindle adapter. The relative positions of the supporting shelves 21 and the separating blades 33 are such that upon operation of the mechanism the separating blades extend between the lowermost and next to lowermost record of a stack of records supported by the shelves 21, to effect a record change as described above.

When the record selecting means of the standard small diameter spindle releases the operating lever 81 from the position shown in Figure 8, the spring 30 forces the supporting shelves 21 outwardly of the adapter body and an auxiliary spring, not shown, may be such as the spring 27 shown in Figures 3 and 6.

In accordance with the present invention, an improved spindle adapter has been provided which provides simple and positive action for effecting record changing operations. It can be seen that this spindle is of rugged construction and capable of giving dependable operation over a long period of time.

What is claimed is:

1. For use with an automatic record changer of the type having a turntable spindle with record supporting and selecting means housed therein, a spindle adapter for detachably mounting on and surrounding said turntable spindle, comprising a body portion of a dimension for receiving and aligning enlarged center hole records to be played, a pair of record supporting shelves normally extending from said body portion mounted for radial movement with respect to said body portion, a pair of record separating blades normally positioned within said body portion disposed above said shelves, said record separating blades being movable to extend from said body portion to a position between a lowermost and next-to-lowermost records of a stack of records supported on said shelves, a slide bar, means comprising the selecting means housed in said turntable spindle for moving said slide bar from a normal position to a second position, means providing operating levers each individually coupling one of said shelves and said record separating blades to said slide bar to cause said separating blades to extend from said body portion and said supporting shelves to be retracted within said body portion when said slide bar is moved from said normal position to said second portion.

2. For use with an automatic record changer of the type having a turntable spindle with record supporting and selecting means housed therein, a spindle adapter detachably mounted on and surrounding said turntable spindle, said spindle adapter being of the center hole diameter of enlarged center hole records to be played, a pair of record supporting shelves normally extending from said adapter mounted for radial movement with respect to said spindle adapter, a pair of record separating blades normally positioned within said adapter disposed above said shelves, a slide bar adapted to be engaged and operated by the selecting means housed in said turntable spindle, said slide bar positioned for movement transverse to the movement of said shelves, means providing a first pair of pivoted operating levers each operatively connecting one end of said slide bar to one of said shelves, and a second pair of pivoted operating levers each operatively connecting the other end of said slide bar to one of said record separating blades being movable to extend from said spindle adapter a distance above said shelves corresponding to the thickness of a record to be played, said supporting shelves being movable to a position within said adapter in response to movement of said slide bar by the selecting means housed in said turntable spindle.

3. For use with an automatic record changer of the type having a turntable spindle with record supporting and selecting means housed therein, a spindle adapter detachably mounted on and surrounding said turntable spindle, the diameter of said spindle adapter being substantially the same as the diameter of the center hole diameter of enlarged center hole records, a pair of oppositely disposed record supporting shelves normally extending from said spindle adapter mounted for radial movement with respect to said adapter, a pair of oppositely disposed record separating blades normally positioned within said spindle adapter above said shelves, said record separating blades being movable during a record changing cycle to extend from said adapter between a lowermost and next-to-lowermost records of a stack of records supported on said shelves, an elongated slide bar positioned for engagement and operation by the selecting means housed in said turntable spindle, said slide bar positioned for movement transverse to the movement of said shelves, a first pair of pivotally mounted operating levers each having a pair of arms, one of each of said levers operatively connected to one end of said slide bar and the other arm of each said levers operatively connected to one of said shelves, a second pair of operating levers each having a pair of arms, one arm of each of said second pair of levers operatively connected to the other end of said slide bar and the other arm of each of said levers operatively connected to one of said record separating blades and means for mounting said slide bar so that displacement thereof by the selecting means housed in said turntable spindle moves said separating blades to extend from said adapter and retracts said supporting shelves to a position within said adapter.

4. For use with an automatic record changer of the type having a turntable spindle with record supporting and selection means housed therein, a spindle adapter detachably mounted on and surrounding said turntable spindle, said spindle adapter having a cylindrical housing the diameter of which is substantially the same as the diameter of the center holes of enlarged center hole records, said housings having an axial bore to receive the turntable spindle, a pair of oppositely disposed record supporting shelves normally extending from said housing mounted near the top of said housings for radial movement with respect thereto, a pair of movable oppositely disposed record separating blades normally positioned within said housing directly above said shelves, said record separating blades being movable during a record changing cycle to extend from said housing to a position between a lowermost and next-to-lowermost records of a stack of records supported on said shelves, an elongated slide bar transversely disposed with respect to said adapter housing and having a cut out portion in alignment with said axial bore so that said turntable spindle may project therethrough, said slide bar positioned adjacent said record selecting means of the turntable spindle when said adapter is mounted on said turntable spindle, a first pair of pivotally mounted operating levers each having a pair of arms, one arm on each of said levers operatively connected to one end of said slide bar and the other arm of each of said levers operatively connected to one of said shelves, a second pair of operating levers each having a pair of arms, one arm of each of said second pair of levers operatively connected to the other end of said slide bar and the other arm of each of said levers operatively connected to one of said operating blades whereby displacement of said slide bar by the selecting means housed in said turntable spindle moves said operating blades to extend from said adapter housing and to retract said supporting shelves to a position within said adapter housing.

5. In an automatic record changer as defined in claim 4, wherein spring biasing means are connected with said slide bar to return it to a normal position after movement by the record selecting means housed in the turntable spindle.

6. For use with an automatic record changer of the type having a turntable spindle with record supporting and selecting means housed therein, a spindle adapter detachably mounted on and surrounding said turntable spindle, the diameter of said adapter being substantially the same as that of the center hole diameter of enlarged center hole records, a pair of oppositely disposed record supporting shelves normally extending from said adapter mounted for radial movement with respect to said adapter body, a pair of oppositely disposed record separating blades normally positioned within said adapter mounted above said shelves, said record separating blades being movable during a record changing cycle to extend from said adapter a distance above said shelves substantially corresponding to the thickness of a record to be played, an elongated slide bar positioned for engagement and operation by the selecting means housed in said turntable spindle, said slide bar positioned for movement transverse to the movement of said shelves, a first pair of operating levers having a common pivot point on one end of said slide bar each operatively connected to one of said shelves, a second pair of operating levers having a common pivot point on the other end of said slide bar each operatively connected with one of said record separating blades, and means for mounting said slide bar so that movement thereof by the selecting means housed in said turntable spindle moves the separating blades outwardly from said spindle adapter and retracts said supporting shelves to a position within said adapter.

7. For use with an automatic record changer of the type having a turntable spindle with record supporting and selecting means housed therein, a spindle adapter detachably mounted on and surrounding said turntable spindle, the diameter of said spindle adapter being substantially the same as that of the center hole diameter of enlarged center hole records to be played, record selecting means used in said adapter comprising a pair of record supporting shelves normally extending from said spindle adapter mounted for movement with respect to said adapter body and a pair of record separating blades normally positioned within said spindle adapter disposed above said shelves, said record separating blades being movable to extend from said spindle adapter a distance above said shelves substantially corresponding to the thickness of a record to be played, a slide bar, at least one pivotally mounted operating lever operatively connecting said slide bar to one of the elements of said record selecting means, and means for mounting said slide bar so that movement thereof causes said separating blades to extend from said adapter and said supporting shelves to be retracted within said adapter in response to movement of said slide bar from a normal position to a second position.

References Cited in the file of this patent

UNITED STATES PATENTS

| | | |
|---|---|---|
| 2,666,647 | Dale | Jan. 19, 1954 |
| 2,683,039 | Fortune | July 6, 1954 |

FOREIGN PATENTS

| | | |
|---|---|---|
| 674,361 | Great Britain | June 25, 1952 |

UNITED STATES PATENT OFFICE

CERTIFICATE OF CORRECTION

Patent No. 2,858,134 October 28, 1958

Elwood S. Maris, Sr.

It is hereby certified that error appears in the printed specification of the above numbered patent requiring correction and that the said Letters Patent should read as corrected below.

Column 3, line 11, for "shawn" read -- as shown --; column 6, line 71, after "one" insert -- arm --; line 72, after "each" insert -- of --.

Signed and sealed this 3rd day of February 1959.

(SEAL)
Attest:

KARL H. AXLINE
Attesting Officer

ROBERT C. WATSON
Commissioner of Patents